US008380217B2

(12) United States Patent
Caldwell et al.

(10) Patent No.: US 8,380,217 B2
(45) Date of Patent: Feb. 19, 2013

(54) CONTROLLING ACCESS TO AN IP-BASED WIRELESS TELECOMMUNICATIONS NETWORK VIA ACCESS POINT MANAGEMENT

(75) Inventors: Christopher E. Caldwell, Woodstock, GA (US); Janne P. Linkola, Espoo (FI); Sukhjinder Singh, Upper Darby, PA (US)

(73) Assignee: T-Mobile USA, Inc., Bellevue, WA (US)

( * ) Notice: Subject to any disclaimer, the term of this patent is extended or adjusted under 35 U.S.C. 154(b) by 488 days.

(21) Appl. No.: 12/446,970

(22) PCT Filed: Oct. 23, 2007

(86) PCT No.: PCT/US2007/082305
§ 371 (c)(1),
(2), (4) Date: Nov. 24, 2009

(87) PCT Pub. No.: WO2008/140555
PCT Pub. Date: Nov. 20, 2008

(65) Prior Publication Data
US 2010/0103831 A1    Apr. 29, 2010

Related U.S. Application Data

(60) Provisional application No. 60/862,593, filed on Oct. 23, 2006.

(51) Int. Cl.
*H04W 72/00* (2009.01)
*H04L 12/26* (2006.01)
*H04L 12/28* (2006.01)

(52) U.S. Cl. .................. 455/453; 370/252; 370/395.2; 370/395.21

(58) Field of Classification Search .................. 370/230; 455/453
See application file for complete search history.

(56) References Cited

U.S. PATENT DOCUMENTS

| 5,406,615 | A | 4/1995 | Miller, II et al. |
| 6,647,426 | B2 | 11/2003 | Mohammed |
| 6,680,923 | B1 | 1/2004 | Leon |
| 6,922,559 | B2 | 7/2005 | Mohammed |
| 6,925,074 | B1 | 8/2005 | Vikberg et al. |
| 7,127,250 | B2 | 10/2006 | Gallagher et al. |
| 7,308,263 | B2 | 12/2007 | Gallagher et al. |
| 7,324,818 | B2 | 1/2008 | Gallagher et al. |
| 7,565,145 | B2 | 7/2009 | Gallagher et al. |
| 2002/0156897 | A1 | 10/2002 | Chintalapati et al. |
| 2002/0167933 | A1 | 11/2002 | Feli et al. |
| 2002/0197991 | A1 | 12/2002 | Anvekar et al. |
| 2003/0114158 | A1 | 6/2003 | Soderbacka et al. |
| 2003/0119490 | A1 | 6/2003 | Mohammed |

(Continued)

OTHER PUBLICATIONS

International Search Report and Written Opinion, International Application No. PCT/US2006/049341, Filed on Dec. 27, 2006, Applicant: T-Mobile USA, Inc., Date of Mailing: Oct. 11, 2007, 8 pages.

(Continued)

*Primary Examiner* — Huy C Ho

(57) ABSTRACT

An access point management facility manages use of an access point configured for IP-based communications in a telecommunications system. The facility allows for the establishment of one or more static and/or dynamic parameters for limiting use of the access point for IP-based communications. The facility monitors traffic on the access point and determines whether any requests for use of the access point complies with the parameters for limiting use. The facility then denies or redirects a request for use of the access point if otherwise permitting the request would not comply with the parameters for limiting use of the access point.

24 Claims, 6 Drawing Sheets

U.S. PATENT DOCUMENTS

| | | |
|---|---|---|
| 2003/0176186 A1 | 9/2003 | Mohammed |
| 2004/0001461 A1 | 1/2004 | Lohtia et al. |
| 2004/0090958 A1 | 5/2004 | Park et al. |
| 2004/0095914 A1* | 5/2004 | Katsube et al. ............... 370/338 |
| 2004/0105416 A1* | 6/2004 | Rue ............................. 370/338 |
| 2005/0018637 A1 | 1/2005 | Karoubalis et al. |
| 2005/0090259 A1 | 4/2005 | Jain et al. |
| 2005/0221828 A1 | 10/2005 | Wakuta et al. |
| 2006/0020694 A1 | 1/2006 | Nag et al. |
| 2006/0058021 A1 | 3/2006 | Fox et al. |
| 2006/0058032 A1 | 3/2006 | Pearce et al. |
| 2006/0062225 A1 | 3/2006 | Li |
| 2006/0098598 A1 | 5/2006 | Gallagher |
| 2006/0111112 A1 | 5/2006 | Maveddat |
| 2006/0223498 A1 | 10/2006 | Gallagher et al. |
| 2007/0008885 A1 | 1/2007 | Bonner |
| 2009/0219826 A1 | 9/2009 | Linkola et al. |

OTHER PUBLICATIONS

International Search Report and Written Opinion, International Application No. PCT/US2007/82305, Filed on Oct. 23, 2007, Applicant: T-Mobile USA, Inc., Date of Mailing: Nov. 3, 2008, 10 pages.

Leggio, Simone et al., "Achieving Seamless Mobility in IP-Based Radio Access Networks," IEEE Wireless Communications, Feb. 2005, pp. 54-59.

Ooghe, S. et al., "Supporting Quality of Service in Broadband Access Networks," Alcatel Communications Review, 2nd Quarter 2005, pp. 128-133.

Rexhepi, Vlora et al., "Performance of Streaming Services in GERAN A/Gb Mode," Nokia Research Center, IEEE 2004, pp. 4511-4515.

* cited by examiner

CONTROLLING ACCESS TO AN IP-BASED WIRELESS TELECOMMUNICATIONS NETWORK VIA ACCESS POINT MANAGEMENT

CROSS-REFERENCE TO RELATED APPLICATION

This application is a U.S. National Stage application of International Application No. PCT/US07/82305, entitled CONTROLLING ACCESS TO AN IP-BASED WIRELESS TELECOMMUNICATIONS NETWORK VIA ACCESS POINT MANAGEMENT, filed Oct. 23, 2007, which claims priority to U.S. Provisional Patent Application No. 60/862,593, filed Oct. 23, 2006, entitled "System and Method of Controlling Access to an IP-Based Wireless Telecommunications Network at an Access Point and a Network Controller," each of which is herein incorporated by reference.

BACKGROUND

In this digital age, modern telecommunication service providers and device manufacturers are increasingly relying on public and/or private IP networks, including the Internet, as a core part of their technology. For example, many telecommunications service providers now offer a suite of Voice over IP ("VoIP") services, as well as various data services, that utilize IP networks and/or IP-based wireless access networks (e.g., access networks based on IEEE 802.16 ("WiMAX"), IEEE 802.20 Mobile Broadband Wireless Access (MBWA), Ultra Wideband (UWB), 802.11 wireless fidelity ("Wi-Fi"), Bluetooth, and similar standards) for at least part of their infrastructure. Likewise, device manufacturers are producing the next generation of mobile devices (e.g. wireless handhelds, wireless handsets, mobile phones, personal digital assistances, notebook computers, and similar devices) that are enabled to send and receive information utilizing IP-based telecommunications services. In fact, many of today's modern mobile devices are able to function as "dual-mode devices" that take advantage of both cellular network technologies and IP-based technologies.

Unlicensed Mobile Access (UMA) technology has developed as part of this trend to incorporate IP solutions into mobile device telecommunication systems. UMA technology has recently been accepted into Release 6 of the 3rd Generation Partnership Project (3GPP) and is also referred to as Generic Access Network (GAN) technology. In various implementation schemes, UMA allows wireless service providers to merge cellular networks (such as Global System for Mobile Communications (GSM) networks) and IP-based wireless networks into one seamless service (with one mobile device, one user interface, and a common set of network services for both voice and data). One goal of UMA is to allow subscribers to move transparently between cellular networks and IP-based wireless networks with seamless voice and data session continuity, much like they can transparently move between cells within the cellular network. Seamless in-call handover between the IP-based wireless network and the cellular network ensures that the user's location and mobility do not affect the services delivered to the user.

At an operational level, UMA technology effectively creates a parallel radio access network, the UMA network, which interfaces to the mobile core network using standard mobility-enabled interfaces. For example, UMA can replace a system's GSM radio technology on the lower protocol layers with a wireless LAN or similar technology. A call or other communication may be tunneled to the switch (e.g., Mobile Switching Center or MSC) of a mobile service provider via an access point (e.g., a WiFi access point connected to a modem via the Internet) and gateway (e.g., a UMA network controller). In many cases, the mobile core network remains unchanged, making it much easier to maintain full service and operational transparency and allowing other aspects of the service infrastructure to remain in place. For example, in many systems that utilize UMA, the existing service provider's business support systems (BSS), service delivery systems, content services, regulatory compliance systems, and operation support systems (OSS) can support the UMA network without change. Likewise, service enhancements and technology evolution of the mobile core network apply transparently to both cellular access and UMA.

As the incorporation of IP solutions, such as UMA, into mobile device telecommunication systems expands, wireless service providers and wireless users may face various obstacles. For example, one challenge involves ensuring that communication quality is maintained for devices connected to an access point. Since access point capacity is not typically considered when authorizing a new access point user, it is possible for a mobile device user to connect to an access point that is already overburdened. Accessing a congested access point may cause poor call quality due to transmission delays or even packet loss. Because traffic-related problems are typically transient, the sporadic quality of service changes could create costly customer support issues and customer dissatisfaction. The need exists for a system that overcomes the above problems, as well as one that provides additional benefits. Overall, the examples herein of some prior or related systems and their associated limitations are intended to be illustrative and not exclusive. Other limitations of existing or prior systems will become apparent to those of skill in the art upon reading the following Detailed Description.

DETAILED DESCRIPTION

The following description provides specific details for a thorough understanding of, and enabling description for, various embodiments of the technology. One skilled in the art will understand that the technology may be practiced without many of these details. In some instances, well-known structures and functions have not been shown or described in detail to avoid unnecessarily obscuring the description of the embodiments of the technology. It is intended that the terminology used in the description presented below be interpreted in its broadest reasonable manner, even though it is being used in conjunction with a detailed description of certain embodiments of the technology. Although certain terms may be emphasized below, any terminology intended to be interpreted in any restricted manner will be overtly and specifically defined as such in this Detailed Description section.

I. Sample Network Configurations

Figure 1:
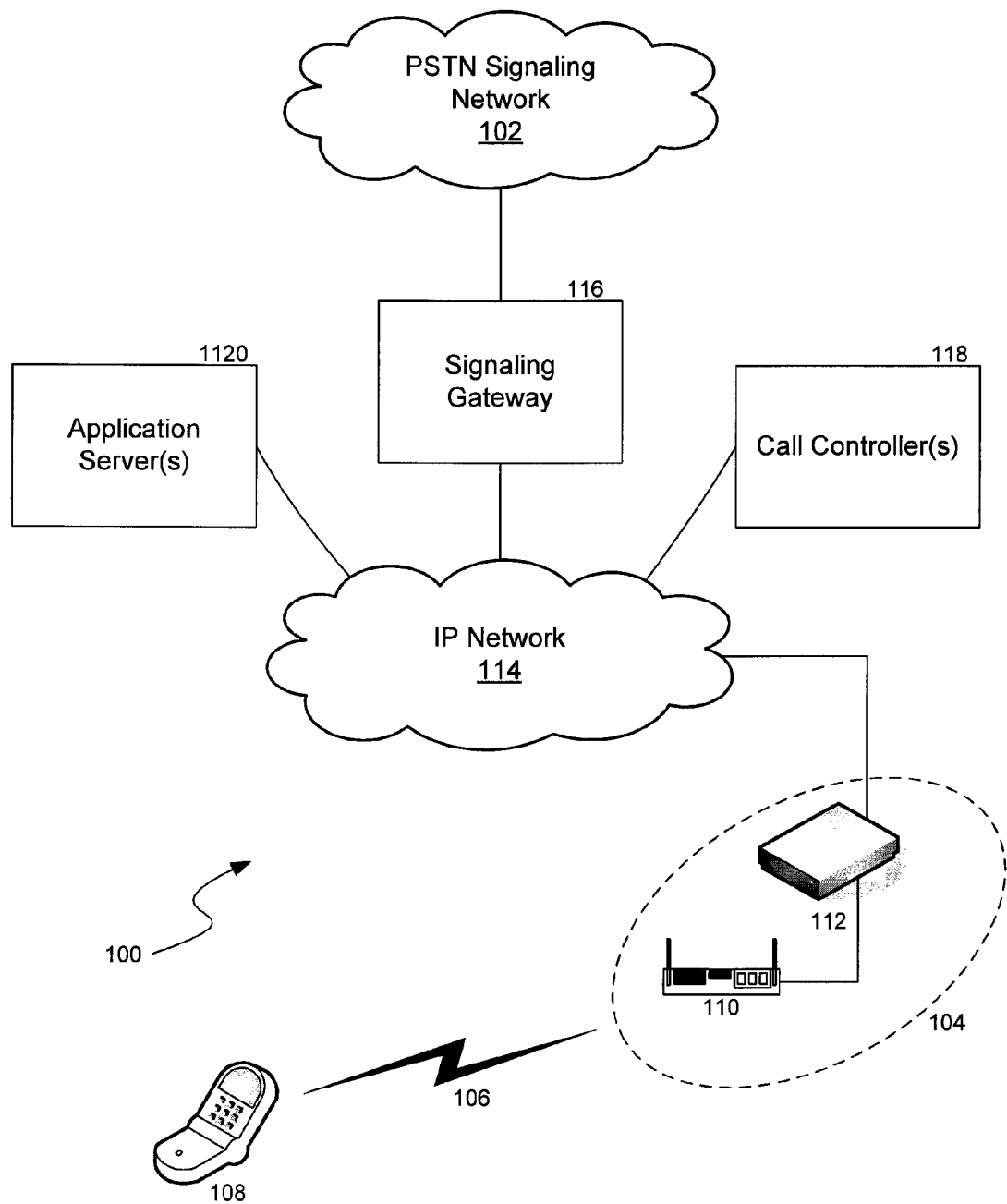
FIG. 1 illustrates aspects of a sample network system that allows VoIP-based communications in conjunction with a public switched telephone network (PSTN).
Figure 2:
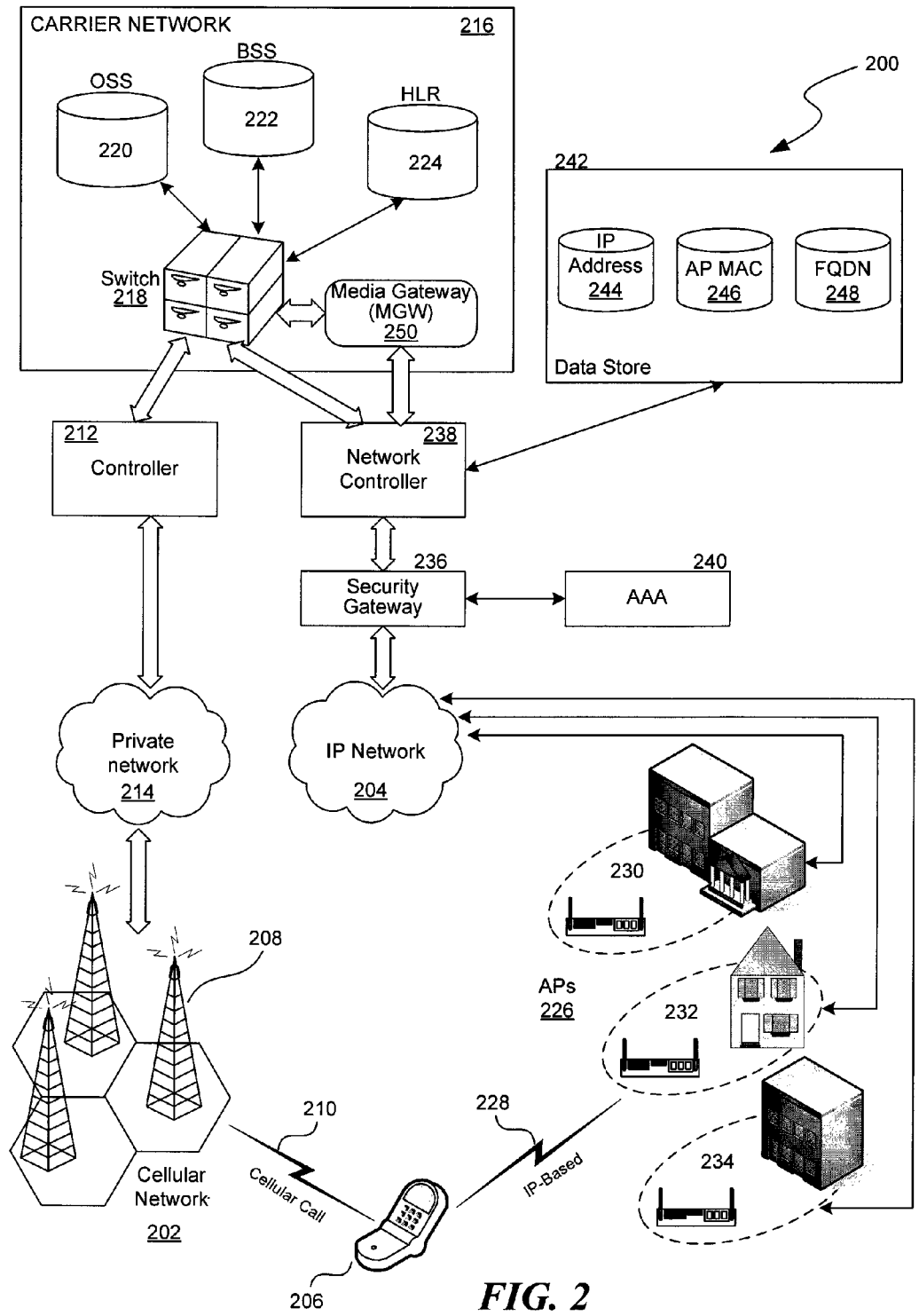
FIG. 2 illustrates an example converged wireless network system that combines a cellular network with an IP-based wireless telecommunications network.
Figure 3:
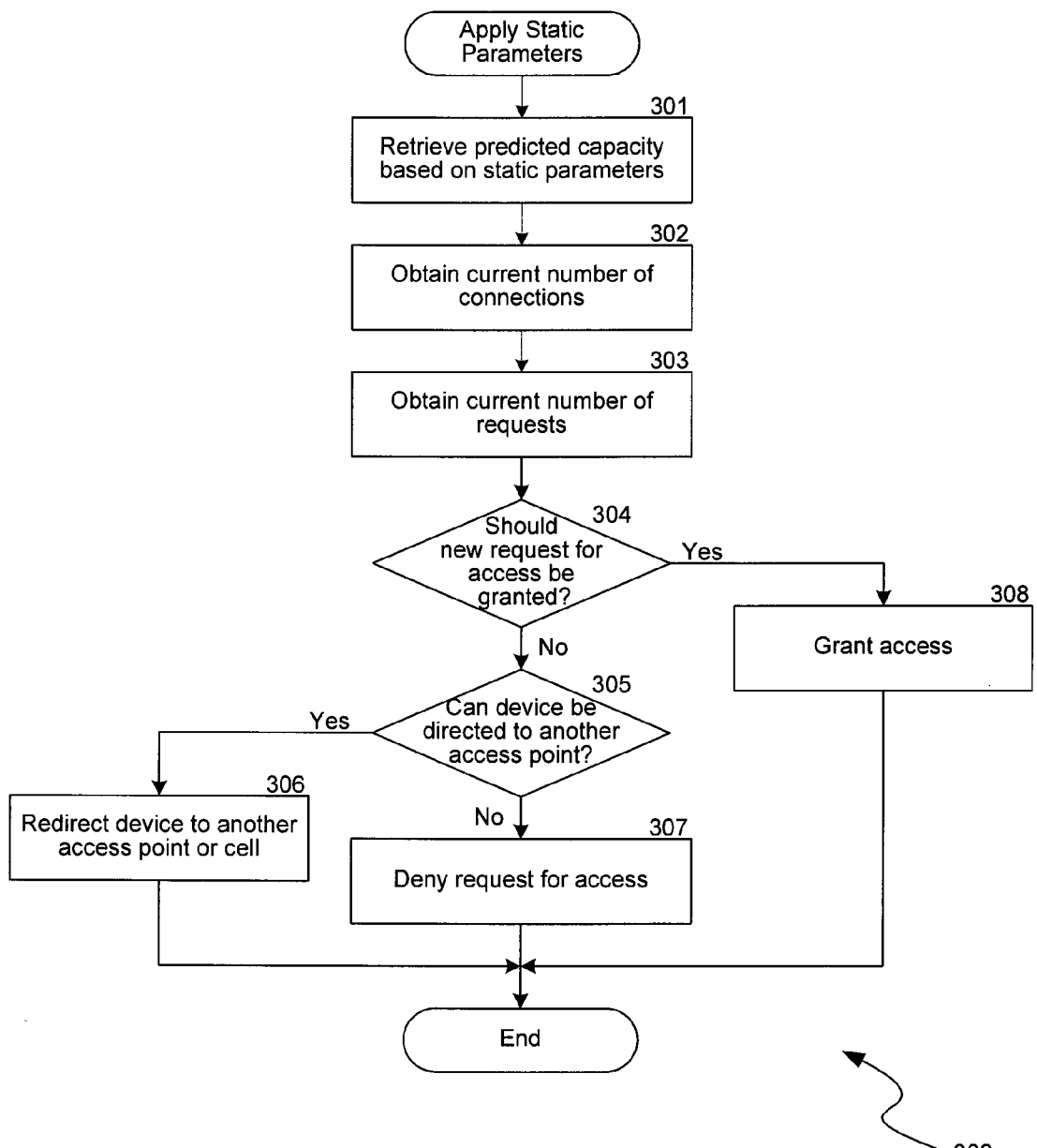
FIG. 3 shows a sample routine performed by an access point management facility to apply static parameters to manage use of an access point.
Figure 4:
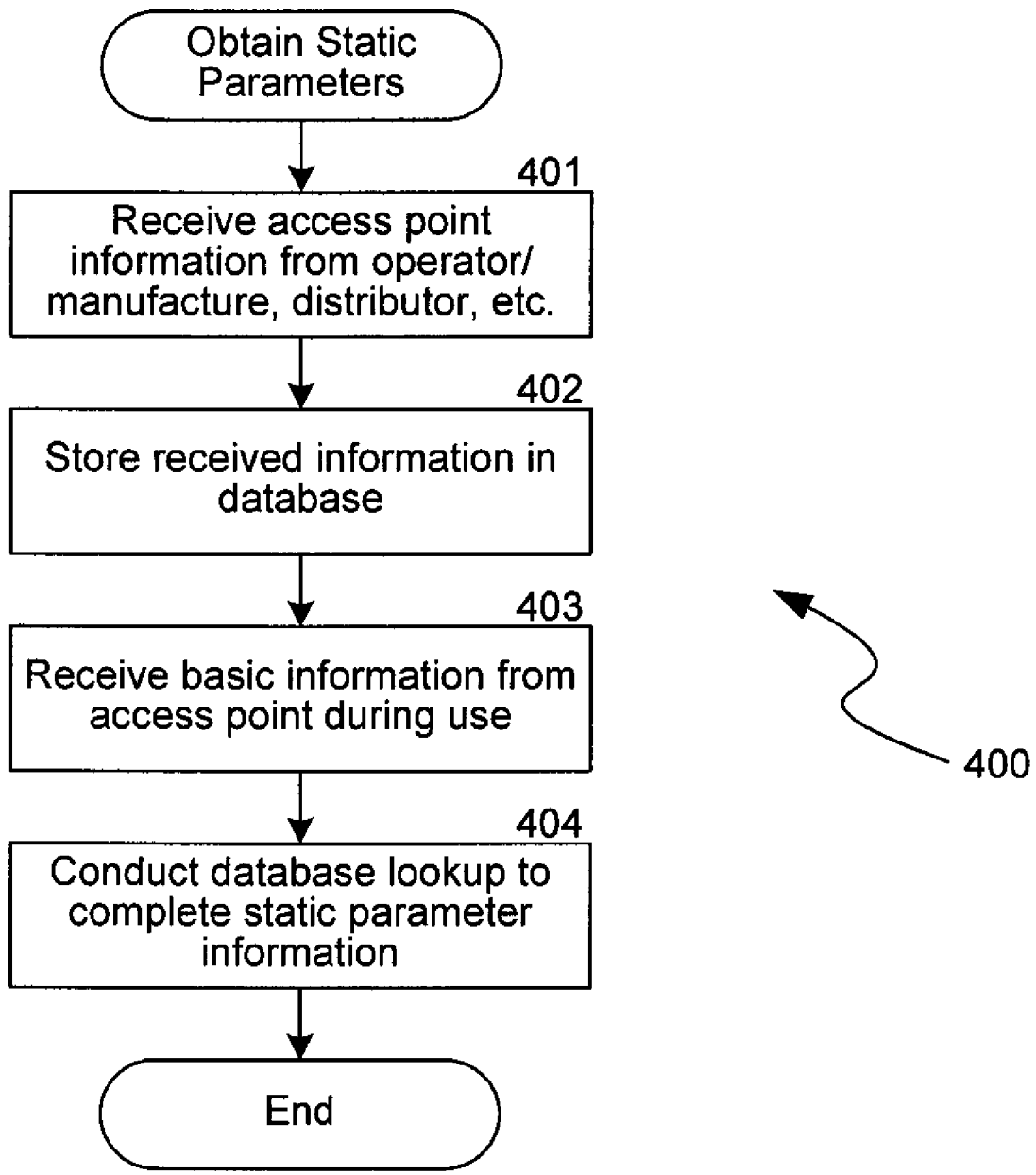
FIG. 4 shows a sample routine to collect static information for use by the access point management facility.

FIGS. 1 and 2 show a sample network system configurations in which aspects of an access point management facility can be implemented in accordance with various embodiments. In general, one purpose of the access point management facility is to manage access to an access point to maintain quality of service with respect to communications routed through that access point.

FIG. 1 illustrates aspects of a sample network system 100 that allows VoIP-based communications in conjunction with a public switched telephone network (PSTN) 102. The system 100 includes at least one wireless access point 104. Aspects of the access point management facility may be implemented, at least in part, on the at least one wireless access point 104. The access point 104 may be public or private, and may be located, for example, in a subscriber's residence (e.g., home, apartment or other residence), in a public location (e.g., coffee shops, retail stores, libraries, or schools) or in corporate or other private locations. In the sample system of FIG. 1, the access point 104 can accept communications 106 from at least one suitably configured telecommunications device 108 (e.g., a VoIP device). Various examples of network technology that may be involved in communicating between the telecommunications device 108 and the access point 104 include the IEEE 802.16 (WiMAX), IEEE 802.20 Mobile Broadband Wireless Access (MBWA), Ultra Wideband (UWB), 802.11 wireless fidelity (Wi-Fi), Bluetooth standards, or other similar standards. The access point 104 includes a wireless router 110 and a broadband modem 112 that enable connection to an Internet Protocol (IP) network 114. The IP network 114 may comprise one or more public networks, private networks, or combination of public and private networks.

In a communication or set of communications 106, the access point 104 receives IP packets from the telecommunications device 108. These IP packets are then transported through the IP network 114 to a signaling gateway 116, which in the example of FIG. 1, is operated by a telecommunications service provider. At the signaling gateway 116, the IP packets are converted to a traditional phone service signal. The phone service signal is then conveyed to a recipient via the PSTN 102.

The network system 100 of FIG. 1 also includes a call controller 118 that provides call logic and call control functions for communications sent through the system and an application server 120 that provides logic and execution of one or more applications or services offered by the telecommunications service provider, such as applications that implement various access and security rules. In some embodiments, aspects of the access point management facility may be implemented at the call controller 118 and/or application server 120, as described in more detail below with respect to FIGS. 3-6. In this example, a telecommunication service provider manages both the call controller 118 and the application server 120.

FIG. 2 illustrates a sample network system 200 in which aspects of the access point management facility can be implemented within a cellular telephone-type network. In general, with respect to the network system described in FIG. 2, because the same cellular protocols are used in communications involving IP access points as with traditional radio towers, the cellular service provider maintains a large degree of system compatibility even though using an IP-based network. For example, the various systems of the cellular service provider that deliver content and handle mobility may not even need to be aware that a subscriber's mobile device is on an IP-based wireless telecommunications network. Instead, the various systems of the cellular service provider assume the mobile device is on its native cellular network. The IP network is, therefore, abstracted with respect to the cellular network, regardless of whether the mobile device connects to the cellular network via a base station (e.g., for licensed spectrum access) or a wireless access point (e.g., for licensed, semilicensed and/or unlicensed spectrum access—such as spectrums for IP-based telecommunications). Likewise, at a protocol level, because the same cellular protocols are used in communications involving the IP access points as with traditional radio towers, the cellular service provider maintains a large degree of system compatibility even though using an IP-based network.

Referring to FIG. 2, a sample network system 200 combines a cellular telephone network 202 (such as a GSM network) and an IP network 204 in a UMA-type configuration that provides service to the user of a mobile device 206. Such service may include voice services, and also supplementary services like call forwarding and call waiting, text messaging services (e.g., SMS) and data-based services like ring tone downloads, game downloads, picture messaging, email and web browsing. Further, since the mobile device 206 is connected to an IP network, all manner of data services available over such networks may be provided to the mobile device 206.

In general, the described network system 200 accepts registration requests and communication connections from the mobile device 206. The accepted registration requests can be requests to either the cellular telephone network 202 or to the IP-based network 204. Accordingly, to handle requests to the cellular telephone network 202, the cellular telephone network 202 includes one or more cell towers 208 that are configured to accept cellular communications 210 from the mobile device 206. The cell towers 208 are connected to a base station controller 212 (such as a base station controller/radio network controller (BSC/RNC)) via a private network 214. The private network 214 can include a variety of connections (not shown) such as T1 lines, a wide area network (WAN), a local area network (LAN), various network switches, and other similar components.

The base station controller 212 controls communication traffic to a carrier core network 216, where all communications are managed (including both cellular and IP-based). Components of the carrier core network 216 in this example include a switch (e.g., a mobile switching center or MSC) 218, which is configured to control data/call flows and perform load balancing, as well as other functions. The carrier core network 216 may also include a variety of system databases such as an operation support subsystem (OSS) database 220, a business support system (BSS) database 222, and home location register (HLR) 224 or other central subscriber database that contains details of a carrier's subscribers for billing, call logging, etc.

The sample network system 200 of FIG. 2 further includes one or more access points 226 that can accept IP-based communications 228 from the mobile device 206. For example, each access point 226 can be configured as part of a wireless network in one or more locations such as a public network 230, a home network 232, or a private business network 234. Aspects of the access point management facility may be implemented, at least in part, on the one or more access points 226. Each access point 226 is coupled to the IP network 204 through, for example, a broadband connection (not shown) such as a DSL (Digital Subscriber Line) modem, a cable modem, a satellite modem, or any other broadband device.

When the mobile device 206 attempts to access the IP network 204 (i.e., to initiate an IP-based communication), information (e.g., data, voice, SMS, etc.) is initially formatted in the cellular system's 202 native protocol and then encapsulated into Internet Protocol (IP) packets, which are transmitted to the access point 226 and routed through the IP network 204 to a security gateway 236. In contrast to non-IP communication requests, such transmissions bypass the cellular telephone system's 202 existing network of radio towers. The security gateway 236 controls access to a network controller 238, which communicates with a data store 240 for logging and accessing communications data, and on which aspects of the access point management facility may be implemented. Thus, one function of the network controller 238 is to manage access to the carrier network 216 when dealing with an IP-based communication (in a similar manner to that performed by the base station controller 212 for a non-IP-based communication).

In one example, authentication of a request for access by the mobile device 206 over the IP network 204 is handled by the security gateway 236, which communicates with an authentication, access and authorization (AAA) module 240 that is most likely associated with the carrier network 216. Challenges and responses to requests for access by the mobile device 206 are communicated between the HLR 224 and the AAA module 242. When authorization is granted, the security gateway 236 communicates the assignment of an IP address to the mobile device 206 that requested access. Once the security gateway 236 passes the IP address to the mobile device 206, the public IP address assigned to the mobile device 206 is passed to the network controller 238.

In another authorization example, upon receiving an identifier from the mobile device 206, the network controller 238 may query the data store 242 to determine if the mobile device 206 is authorized for accessing the IP network 204. Sample identifiers that may be utilized to determine access include a media access control (MAC) address associated with an access point, a mobile device or subscriber identifier (such as an International Mobile Subscriber Identifier (IMSI)), an Internet Protocol (IP) address (or "Public IP address") associated with the access point, a fully qualified domain name (FQDN), or other similar types of information. The data store 242 may be a single database, table, or list, or a combination of databases, tables, or lists, such as one for IP addresses 244, one of MAC addresses 246, and one for FQDNs 248. The data store 242 may include "blocked" identifiers as well as "authorized" identifiers. Authorized accesses to the IP-based wireless telecommunications network may be maintained by the network controller 238 in an authorized session table or similar data construct.

In some cases, the signaling portion of a communication (e.g., the portion of the communication that governs various overhead aspects of the communication such as, for example, when the call starts, when the call stops, initiating a telephone ring, etc.) is routed through the network controller 238 to the switch 218, while the voice bearer portion of the communication (e.g., the portion of the communication that contains the actual content (either data or voice information) of the communication) is routed through the network controller 238 to a media gateway 250. In other words, the media gateway 250 controls the content flow between the service provider and the mobile device 206, while the switch 218 controls the signaling flow (or controls overhead-related flow) between the service provider and the mobile device 216.

In general, with respect to FIGS. 1 and 2, some network elements are described herein as performing certain functions. Those functions could be performed by other elements in the same or differing networks, which could reduce the number of network elements. Alternatively or additionally, network elements performing those functions could be replaced by two or more elements to perform portions of those functions.

II. Managing Quality of Service at an Access Point

An access point management facility, as disclosed herein, can be utilized to manage use of a given access point to provide a desired quality of service for mobile devices connected via the access point. For example, a routine performed, at least in part, at a network controller may use static, dynamic and other parameters to evaluate the registration request of a mobile device to connect through an access point. A similar routine performed, at least in part, at an access point can also use dynamic and other parameters to ensure that a satisfactory connection is provided to a mobile device. The measurement and use of static, dynamic and/or other parameters to manage access point traffic is described herein.

A. Static Parameters

The access point management facility (e.g., via a routine executing at a network controller or access point) may use static parameters in determining the maximum number of mobile devices that are allowed to connect to an access point or in order to otherwise maintain a desired quality of service. Static parameters typically pertain to the performance characteristics of an access point, including, but not limited to, the capacity of the access point at any layer of communication (e.g., physical, data link, network, etc.), the network performance of the access point, and other similar parameters. More details about techniques for obtaining static parameters are discussed below and in particular with respect to FIG. 4.

The access point management facility may use static parameters in a variety of situations to manage the number of mobile devices that connect through an access point. Limiting the number of mobile devices allowed on an access point contributes to an improved connection quality of service for IP-based wireless telecommunications mobile devices. For example, as shown a sample routine 300 of FIG. 3, the predicted capacity of an access point as determined by the static parameters (block 301) may be compared against the number of current connections through an access point (block 302) and the number of requests to use the access point (block 303). Based on the comparison, at decision block 304, the routine 300 may determine whether a mobile device should be granted access to connect to a service provider's network via the access point (block 308). For example, if capacity (calculated using static parameters) equals six VoIP connections and forty-five non-VoIP connections, there are currently three VoIP connections through the access point and sixteen non-VoIP connection, and there are two request to use the access point, then these pending requests to use the access point will be granted based on application of the static parameters.

If access is not granted, next, at decision block 305, the routine 300 may also use various parameters to determine whether the device that is requesting access can be directed to another access point (block 306) or whether access by a mobile device should simply be denied (block 307). For example, if the device that is requesting access is a dual-mode device, it may be directed to a cellular network. Likewise, if there are overlapping access points in the area that allow access to the same network, the device requesting access may be directed to such an access point.

The static parameter information used by the access point management routine (such as the routine 300 of FIG. 3) to manage use of an access point (e.g., to predict maximum capacity, etc.) can be obtained in several ways. For example, as part of configuring an access point to support IP-based wireless telecommunications, the owner or operator of the access point may contact a live service support representative for the service provider to register an access point. Through the registration process, the owner/operator of the access point supplies information about the access point that can be used by the access point management facility to determine parameters for use the access point. Such information may include geographic location, SSID, model number, serial number, access point capabilities, any manufacturer supplied information about the access point, and other relevant and useful information. In another example, static parameter information about an access point can be obtained via an interactive voice response system to register the access point with a service provider and provide information about the access point.

Another way to obtain static parameter information used by the access point management facility to manage use of an access point is through the access point's network system registration process, which takes place during normal use. For example, as part of network system registration, an access point may communicate certain types of information about the access point to the network system. Alternatively, the network system may make a request of an access point, via a proprietary or a standard protocol, to supply information about the access point. An example of such is protocol is simple network management protocol (SNMP). As shown in a routine 400 in FIG. 4, obtaining static parameter information using such a protocol may be a multi-step process. More specifically, in a pre-registration or similar process, the access point operator, manufacturer and/or distributor may supply or otherwise make information (e.g., MAC addresses of an access point; an SSID associated with the access point, the purchaser or operator of the access point; the model number of the access point; the specifications of the access point, the capabilities of the access point, the address provided by the access point's purchaser for shipping purposes, etc.) available to the IP-based wireless telecommunications system service provider (block 401), who may store the information the database (block 402). During network system registration (e.g., upon powering up of the access point) the routine 400 receives initial information from the access point (e.g., via SNMP), such as the access point's MAC address (block 403). At block 404, the routine 400 may then correlate information obtained from an access point with information in the database to identify information about the access point, which can then be used at block 301 of the routine 300 of FIG. 3.

B. Dynamic Parameters

In some embodiments, the access point management facility can use dynamic parameters to ensure that a desired quality of service is provided to mobile devices. Dynamic parameters comprise information related to traffic through an access point, such as the number of currently connected mobile devices to the access point, the current number of active conversations through the access point, the amount of other traffic through the access point, the peak bandwidth of an access point's upstream connection, and other dynamic parameters that can affect connection quality for current or prospective mobile IP-based telecommunications devices using an access point. Dynamic parameters may also comprise a loss rate, a total packet rate, and a current packet loss rate on either VoIP or non-VoIP connections. Dynamic parameters may include both the current value of the parameters as well as historical data values for the parameters.

The access point management facility may request information about an access point's dynamic parameters using a standard protocol such as SNMP, or by means of a proprietary protocol. Alternatively, the access point management facility located at a network controller (such as the network controller 238 of FIG. 2) may obtain information about one or more dynamic parameters in a status report that may be sent by the access point. Likewise an access point management facility located an access point can observe packets it sends and receives to measure and/or calculate various dynamic parameters at the access point.

Among the dynamic parameters that may be used by the access point management facility to regulate the use of the access point are the access point's maximum upstream and downstream transmission rates. The upstream transmission rate refers to the rate that packets are sent from the access point to an IP network. The downstream transmission rate refers to the rate that packets are sent from the access point to a mobile device. The upstream transmission rate has a number of uses. For example, the access point management facility may use the obtained maximum upstream transmission rate to decide how many mobile devices to allow on an access point. As another example, the access point management facility may use the maximum upstream transmission rate to determine a limit on the amount of non-VoIP traffic allowed through the access point and/or to balance VoIP traffic and non-VoIP traffic. The access point management facility may also use information about an access point's downstream transmission rate with a mobile device in managing call quality.

The access point management facility can dynamically determine a maximum upstream transmission rate by observing how quickly the access point can transmit and receive data over the upstream connection during actual usage of the access point. In some embodiments, the facility may observe separate maximum transmission rates for VoIP and non-VoIP communications, in order to best meet demands of the access point. An initial maximum upstream transmission rate for a given access point may be determined via the use of test data. However, it may not be necessary to use test data to find an initial maximum upstream transmission rate, since access point users will usually generate upstream traffic in the course of normal access point usage.

Figure 5:
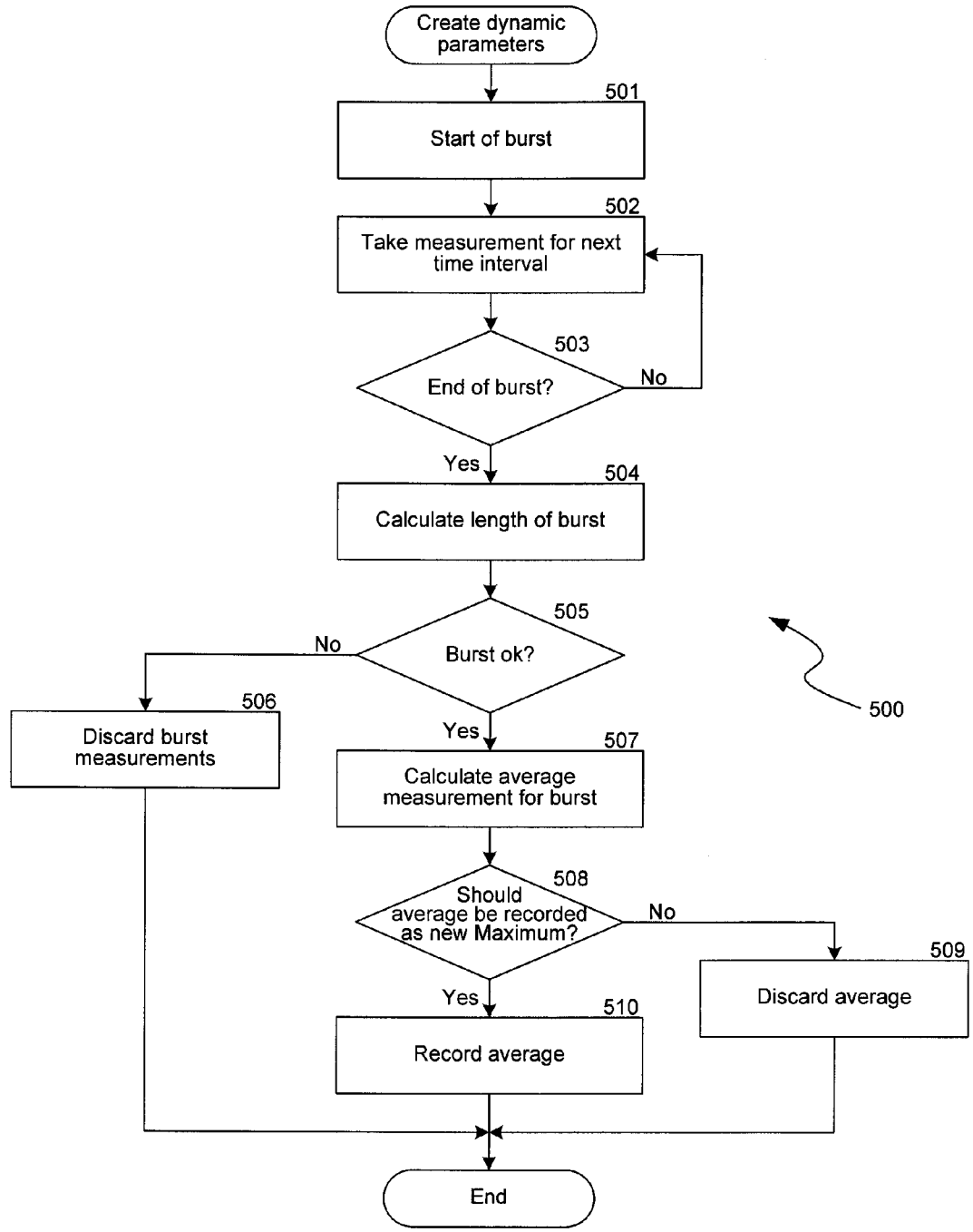
FIG. 5 shows a sample routine to collect dynamic information for use by the access point management facility.

One measure of an access point's upstream maximum bandwidth is a Quarter Daily Upstream Maximum Value metric. FIG. 5 is a flow diagram illustrating a routine 500 for calculating a Quarter Daily Upstream Maximum Value metric at a given access point. The routine 500 is most likely performed at an access point and measures transmission rate and duration of upstream traffic bursts during normal operation. For each burst, the routine 500 measures the upstream transmission rate at regular intervals during the burst (block 502), beginning at a time t=0 (at the beginning of the burst—block 501) and ending at t=n (the end of the upstream burst—decision block 503). The routine 500 also measures the length/duration of the burst (block 504). For example, the burst can be 60 seconds long, and the upstream transmission rate can be measured at 0.5 second intervals. In some cases (shown here in decision block 505 and block 506), the data associated with the burst will be discarded (e.g., if the burst ends before a minimum time period (e.g., less than one second), since it is not long enough to represent the access point's upstream transmission rate accurately). If, at decision block 505, the data for the burst is not to be discarded, the routine 500 determines a data transmission rate for the given burst by taking an average of the upstream transmission rate measured at each interval during the burst (block 507).

At decision block 508, the routine 500 checks the average to determine whether this value will be recorded as the new Quarter Daily Upstream Maximum Value. For example, if the average is too low (e.g., below the current maximum value or below a minimum threshold for burst transmission rates) it may be discarded (block 509). If, at decision block 508, the measured burst transmission rate is greater than the current Quarter Daily Upstream Maximum Value, then the routine 500 stores the burst's upstream transmission rate in a nonvolatile memory location as the new Quarter Daily Upstream Maximum Value (block 510). Optionally, if its is desirable to adjust the transmission rate downward, when the routine 500 may allow for storing new upstream data rates that are less than current Quarter Daily Upstream Maximum Value (e.g., but higher than some minimum threshold). Once example of a case where it may be desirable to adjust a maximum value transmission rate downward is in the case where the maximum value transmission rate relates to VoIP based communications and where the demand for non-VoIP communications at the access point has increased relative to the demand for VoIP communications. In such a case, it would make sense to adjust the maximum value transmission rate for VoIP communications downward and the maximum transmission rate for non VoIP communications upward to reflect the changes in demand.

In some embodiments, the routine 500 stores not only a value for the current quarter daily upstream maximum value (which may initially be set to NULL as a factory default value), but may also have one or more historical registers (e.g., stored in memory at the access point) in which it stores a record of previous Quarter Daily Upstream Maximum Values. For example, once every six hours the access point can observe the Quarter Daily Upstream Maximum Value. If it is not NULL, the routine 500 copies the value to a historical register. In one embodiment, the historical register contains the last sixty-four Quarter Daily Upstream Maximum Values, but other size registers are possible. In the given example, if the historical register is full (e.g., already contains sixty-four values), the writing of the new value causes the deletion of the oldest entry in the registry. In some embodiments, if the user invokes the "restore to factory defaults" function of the access point, an access point stores NULL in the current Quarter Daily Upstream Maximum Value and in all entries in the historical register.

Figure 6:
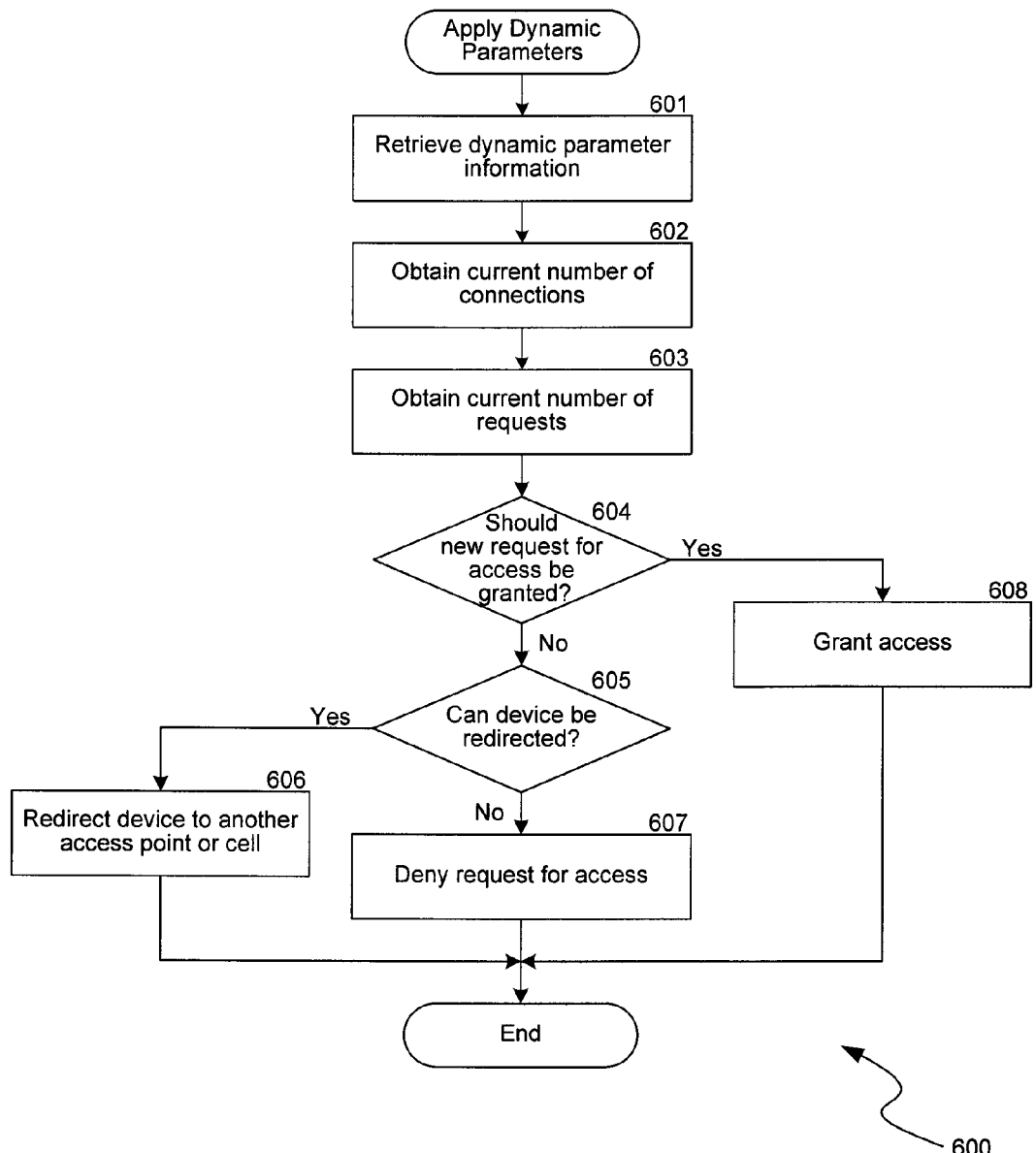
FIG. 6 shows a sample routine performed by the access point management facility to apply dynamic parameters to manage use of an access point.

As shown in FIG. 6, an access point management facility (e.g., located for example, at an access point or network controller) can utilize stored or current Quarter Daily Upstream Maximum Values to limit traffic on a given access point. This ensures a high quality of VoIP service. For example, as shown in a routine 600, the predicted capacity of an access point as determined by the dynamic parameters (block 601) may be compared against the number of current connections through an access point (obtained in block 602) and the number of requests to use the access point (obtained in block 603). In some embodiments, an access point can determine when a VoIP communication is in progress by observing traffic through the access point. Table A below shows sample traffic conditions that may indicate that a VoIP communication has started at a given access point.

TABLE A

There is a two-way stream of Wireless Multimedia Extensions (WMM) voice-prioritized IP packets with a single mobile device
Both directions of the stream described in the previous bullet point (upstream through the WAN connection and downstream to the mobile device) have been actively engaged in sending packets at least every 200 ms for at least the last 5 seconds
The source port of upstream IP packets on the WAN interface is either 500 or 4500
The size of upstream IP packets on the WAN interface is less than 450 bytes Table B below shows sample traffic conditions that may indicate that a VoIP communication has stopped at a given access point.

TABLE B

A mobile device that was previously engaged in a VoIP communication has not sent Wireless Multimedia Extensions (WMM) voice-prioritized packets on source port 500 or 4500 that are less than 450 bytes during the last 5 seconds The access point management facility can use other techniques to identify when a call is in progress. For example, when a mobile device connects to an access point, it may negotiate a protocol that allows it to signal the access point when the mobile device is starting or about to start a VoIP communication. Alternatively, the mobile device may send IP packets that contain an indication of call status in such a way that the access point can detect that VoIP communication is occurring. Other techniques may also be used.

Referring back to FIG. 6, at decision block 604, based on the comparison of the information from blocks 601-603, the routine 600 may determine whether a mobile device should be granted access to connect to a service provider's network via the access point (block 608). If a device is not granted access, next at decision block 605, the routine 600 may use various parameters to determine whether the device that is requesting access can be directed to another access point (block 606) or whether access by a mobile device should simply be denied (block 607). For example, if the device that is requesting access is a dual-mode device, it may be directed to a cellular network. Likewise, if there are overlapping access points in the area that allow access to the same network, the device requesting access may be directed to such an access point. In some cases, it may also be possible to migrate a current active connection to another access point or cell.

In some embodiments, a messaging capability associated with the routine 600 may be used to send a message to the access point and/or the mobile device to facilitate denying the request for access or to redirect/migrate the mobile device to another access point. Limiting the number of mobile devices allowed on the access point contributes to an improved connection quality of service for IP-based wireless telecommunications mobile devices.

Another use of stored or current Quarter Daily Upstream Maximum Values by the access point management facility is to limit non-VoIP traffic when a VoIP communication is in progress. This ensures a high quality of VoIP service. For example, an access point can combine Quarter Daily Upstream Maximum Value data with information about whether a VoIP communication is in progress to determine when to limit non-VoIP traffic, and what that limit should be. More specifically, during a VoIP communication an access point can limit non-VoIP upstream traffic from its WAN port to a value that is some amount (e.g., such as 60 kbps) less than the highest of the following values:

The highest of the seven previous values in the historical register, rounded up to the nearest multiple of 128 kbps.
Currently stored Quarter Daily Upstream Maximum Value, rounded up to the nearest multiple of 128 kbps.

In some embodiments, when the access point management facility is determining a limit for non-VoIP traffic, if the currently stored Quarter Daily Upstream Maximum Value is NULL and all of the values in the historical register are NULL, the access point management facility may not limit non-VoIP traffic, even when the access point observes a VoIP communication on the radio interface. Alternatively, when either the currently stored Quarter Daily Upstream Maximum Value is less than 512 kbps or any of the top seven values in the historical register are less than 512 kbps, the access point management facility may limit non-VoIP traffic. While this example describes examining the top seven values, the actual number of values examined may vary in practice.

Another dynamic parameter that may be used by the access point management facility to regulate the use of the access point includes information about the type of IP packets sent and received by a mobile device, which can be used to prioritize traffic for that mobile device. For example, an access point may assign connections associated with VoIP service a higher priority than non-VoIP traffic. The access point may observe packets tagged as Wireless Multimedia Extensions (WMM) "voice" packets, and give those packets a higher priority due to this observation. Further, even when IP packets are not specifically tagged as WMM voice packets, the access point management facility may still give priority to a connection if it meets certain conditions (e.g., the source port of the incoming IP packet on the WAN interface is either 500 or 4500; the size of the incoming IP packet on the WAN interface is less than 450 bytes, etc.).

Still another of dynamic parameter that may be used by the access point management facility to regulate the use of the access point is the distance of a mobile device from the access point. As an example, if the mobile device is near the edge of the coverage area of its access point, the mobile device may use a slower transmission speed until it moves closer to the access point. In such situations, the access point may be able to handle either an increase or decrease in the number of connections. Accordingly, the access point management facility may, thus, take into consideration such factors when managing a given access point.

A variety of dynamic parameters can be used by the access point management facility to manage traffic through the access point. While this disclosure discusses several dynamic parameters, one skilled in the art can appreciate that many other dynamic parameters other than those described may be used to accomplish a similar function.

C. Other Parameters

Other parameters that do not directly relate to bandwidth capacity can play a role in the access point management facility's decision about whether to allow an IP-based voice telecommunications device to connect via an access point. These other parameters may include, but not be limited to, information about the identity of a calling party, information about the identity of a called party, call statistics such as call duration, scheduled events, geography, and other parameters. Other parameters may also include, as applicable, the quality of GERAN (GSM/GPRS EDGE Radio Access Network) signals available to a requesting or currently connected device; knowledge about planned or unplanned downtime or maintenance activity that could affect the access point, a network controller, or connectivity between the access point and a network controller; the day of the week, or the hour of the day; the current date or time; the call history of an IP-based wireless voice telecommunication device; for an access point owned by a company, the role of the calling or called party within the company may be considered; and other parameters that are pertinent to maintaining satisfactory IP-based wireless telecommunications service to VoIP customers. For example, two mobile devices may request to connect through an access point. Even when there is enough capacity available to allow both IP-based wireless telecommunications devices to connect to the VoIP service via the access point, the access point management facility may only allow one mobile device to connect. One reason to reject a mobile's request is that a company operating the access point does not currently offer service to the mobile device.

III. Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the methods and system provided herein can be applied to other systems, not necessarily the system described above. For example, the telecommunications device/mobile device discussed herein could be a non-IP-enabled mobile phone that connects to an IP-enabled femtocell that is connected to an IP-based telecommunications network over an IP network. As a second example, the telecommunications device/mobile device could be an analog telephone that connects to an IP-enabled terminal adaptor that is connected to an IP-based telecommunications network over an IP network. As a third example, the telecommunications device/mobile device could be an IP-enabled softmobile (e.g., a personal computer having a USB device with an embedded SIM and UMA softphone application) that is connected to an IP-based telecommunications network over an IP network. The telecommunications device/mobile device may also include other devices, such as wearable computers, devices that perform monitoring or tracking functions, and any other device (or combination of devices) that is IP-enabled, either in hardware, software, or a combination of both hardware and software. Therefore, those of skill in the art will understand that various configurations are possible and that the facility can be implemented in a wide variety of environments. In general, the elements and acts of the various embodiments described above can be combined to provide further embodiments.

Any patents and applications and other references noted above, including any that may be listed in accompanying filing papers, are incorporated herein by reference. Aspects of the technology can be modified, if necessary, to employ the systems, functions, and concepts of the various references described above to provide yet further embodiments of the technology.

These and other changes can be made to the invention in light of the above Detailed Description. While the above description describes certain embodiments of the technology, and describes the best mode contemplated, no matter how detailed the above appears in text, the invention can be practiced in many ways. Details of the system may vary considerably in its implementation details, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

While certain aspects of the technology are presented below in certain claim forms, the inventors contemplate the various aspects of the technology in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the technology.

We claim:

1. A method for managing use of an access point configured for internet protocol-based communications in a telecommunications system, the method comprising:
    establishing, at an access point management facility, one or more parameters for limiting use of the access point for internet protocol-based communications in the telecommunications system,
        wherein the parameters include a first set of parameters used to control voice over internet protocol communications and a second set of parameters used to control non voice over internet protocol communications, and
        wherein at least one of the parameters are dynamic and are determined, at least in part, by:
            periodically measuring upstream transmission rates for the access point and obtaining an average upstream transmission rate based on the periodic measurements, and
            periodically replacing a previously stored current upstream transmission rate value with the averaged measured upstream transmission rate;
    monitoring, at the access point management facility, the access point to determine current use and any requests for use of the access point;
    determining whether a request for use of the access point complies with the parameters for limiting use of the access point; and
    denying the request for use of the access point if permitting the request for use does not comply with the parameters for limiting use of the access point.

2. The method of claim 1 wherein at least one of the parameters are static and are determined, at least in part, by a method comprising:
    collecting and storing information about attributes of the access point via a pre-registration process, wherein the attributes include one or more of a medium access control addresses of the access point, a service set identifier associated with the access point, information about the owner/operator of the access point, a model number for the access point, and information about the capabilities of the access point;
    receiving a registration request from the access point, wherein the registration request is a request to access one or more network components of the telecommunications system to establish a communication pathway, wherein the registration request includes an access point identifier; and
    correlating information in the received registration request with the stored information about attributes of the access point to identify information about the access point; and
    based on the identified information, setting at least one static parameter for limiting use of the access point.

3. The method of claim 1 wherein the averaged measured upstream transmission rate is determined, at least in part, by monitoring bursts of activity during normal use of the access point and for each monitored burst of activity,
    measuring upstream transmission rates for the access point at regular intervals throughout the duration of the burst, and
    averaging the measured upstream transmission rates for the burst to obtain an average upstream transmission rate for the burst.

4. The method of claim 1 wherein monitoring the access point to determine current use and any requests for use includes observing communication packets tagged as containing voice information and flagging those packets as having a high priority.

5. The method of claim 1 wherein monitoring the access point to determine current use includes monitoring the number of active connections at the access point.

6. The method of claim 1 wherein the monitoring and determining are performed at the access point.

7. The method of claim 1 wherein the monitoring and determining are performed at a network controller associated with the telecommunications network.

8. The method of claim 1 further comprising redirecting the request for use of the access point to another available access point or cell in the area.

9. The method of claim 1 wherein at least one of the parameters relate to the number of active voice over internet protocol connections at the access point.

10. The method of claim 1 wherein the at least one of parameters relate to the number of non-voice over internet protocol connections at the access point.

11. The method of claim 1 wherein monitoring the access point to determine current use includes monitoring the number of active connections at the access point.

12. The method of claim 1 wherein the telecommunications system includes Unlicensed Mobile Access or Generic Access Network configurations.

13. The method of claim 1 wherein the access point is configured to allow a mobile device to establish a wireless connection with the access point, and wherein the access point is further configured to allow connectivity to an internet protocol network associated with the telecommunications system.

14. A system for managing use of an access point configured for facilitating internet protocol-based communications in a telecommunications system, the system comprising:
    a data storage facility configured to store information for managing use of the access point for internet protocol-based communications in the telecommunications system;
    a controller configured to receive information regarding current use of the access point and to determine whether a pending request for use of the access point complies with one or more parameters related to the stored information for managing use of the access point,
       wherein the parameters include a first set of parameters used to control voice over internet protocol communications and a second set of parameters used to control non-voice over internet protocol communications, and
       wherein at least one of the parameters are dynamic and are determined, at least in part, by:
          periodically measuring upstream transmission rates for the access point and obtaining an average upstream transmission rate based on the periodic measurements, and
          periodically replacing a previously stored current upstream transmission rate value with the averaged measured upstream transmission rate; and
    a messaging capability configured to send messages for denying the pending request for use of the access point if permitting the pending request does not comply with the one or more parameters.

15. The system of claim 14 wherein current use of the access point is determined by monitoring whether there is a two-way stream of voice prioritized internet protocol packets flowing through the access point in association with a single mobile device.

16. The system of claim 14 wherein the one or more parameters relate to the number of active connections that the access point can support.

17. The system of claim 14 wherein the data storage facility stores static parameters that pertain to performance characteristics of the access point including the capacity of the access point and/or the network performance of the access point.

18. The system of claim 14 wherein the averaged measured upstream transmission rate is determined, at least in part, by
    monitoring bursts of activity during normal use of the access point and for each monitored burst of activity,
    measuring upstream transmission rates for the access point at regular intervals throughout the duration of the burst, and
    averaging the measured upstream transmission rates for the burst to obtain an average upstream transmission rate for the burst.

19. A method for controlling traffic at an access point in order to maintain a quality of internet protocol-based communication services, the method comprising:
    monitoring, at an access point management facility, upstream internet protocol-based communication traffic on a port associated with the access point; and
    limiting the upstream internet protocol-based communication traffic from the port, so as to not exceed at least one dynamically determined value for a maximum upstream data transmission rate for the access point,
       wherein the at least one dynamically determined maximum upstream data transmission rate includes a first value for limiting voice-based communications and a second value for limiting non-voice based communications at the access point, and
       wherein the at least one dynamically determined value being stored at the access point and determined, at least in part, by:
          periodically measuring upstream transmission rates for the access point and obtaining an average upstream transmission rate based on the periodic measurements, and
          periodically replacing a previously stored current upstream transmission rate value with the averaged measured upstream transmission rate.

20. The method of claim 19 wherein the limiting includes denying a pending request from a mobile telecommunications device to use the access point for a communication.

21. The method of claim 19 wherein the limiting includes redirecting, to another access point or cell, a pending request from a mobile telecommunication device to use the access point for a communication.

22. The method of claim 19 wherein the averaged measured upstream transmission rate is determined, at least in part, by
    monitoring bursts of activity during normal use of the access point and for each monitored burst of activity,
    measuring upstream transmission rates for the access point at regular intervals throughout the duration of the burst, and
    averaging the measured upstream transmission rates for the burst to obtain an average upstream transmission rate for the burst.

23. A non-transitory computer-readable medium containing a data structure, executed by a computer processor, comprising:
    a current maximum transmission value for use in limiting upstream transmissions from an access point configured as a wireless access point to a telecommunications network that includes network components for supporting both internet protocol-based and non-internet protocol based telecommunications,
       wherein the current maximum transmission value includes a first value for limiting voice-based communications and a second value for limiting non-voice based communications at the access point, and
       wherein the current maximum transmission value is determined, at least in part, by:

periodically measuring upstream transmission rates for the access point and obtaining an average upstream transmission rate based on the periodic measurements, and periodically replacing a previously stored current upstream transmission rate value with the averaged measured upstream transmission rate; and a set of historical values, each comprising a previous maximum transmission value for use in limiting upstream transmission from the access point, wherein the current maximum transmission value and the historical values are used by the access point in accepting or denying request from mobile devices to connect to the telecommunications network for making internet protocol-based communications.

24. The non-transitory computer-readable medium of claim 23 wherein the averaged maximum transmission value is determined by a method comprising:

monitoring bursts of activity during use of the access point;

for each monitored burst of activity, measuring upstream transmission rates for the access point at regular intervals throughout the duration of the burst; and averaging the measured upstream transmission rates for the burst to obtain an average upstream transmission rate for the burst.

* * * * *